3,415,615
RECOVERY OF CARBON MONOXIDE BY MEANS OF CUPROUS CHLORIDE IN PROPIONITRILE
George C. Blytas, Kensington, and Edward R. Bell, Lafayette, Calif., assignors to Shell Oil Company, New York, N.Y., a corporation of Delaware
Filed Feb. 21, 1967, Ser. No. 617,532
4 Claims. (Cl. 23—3)

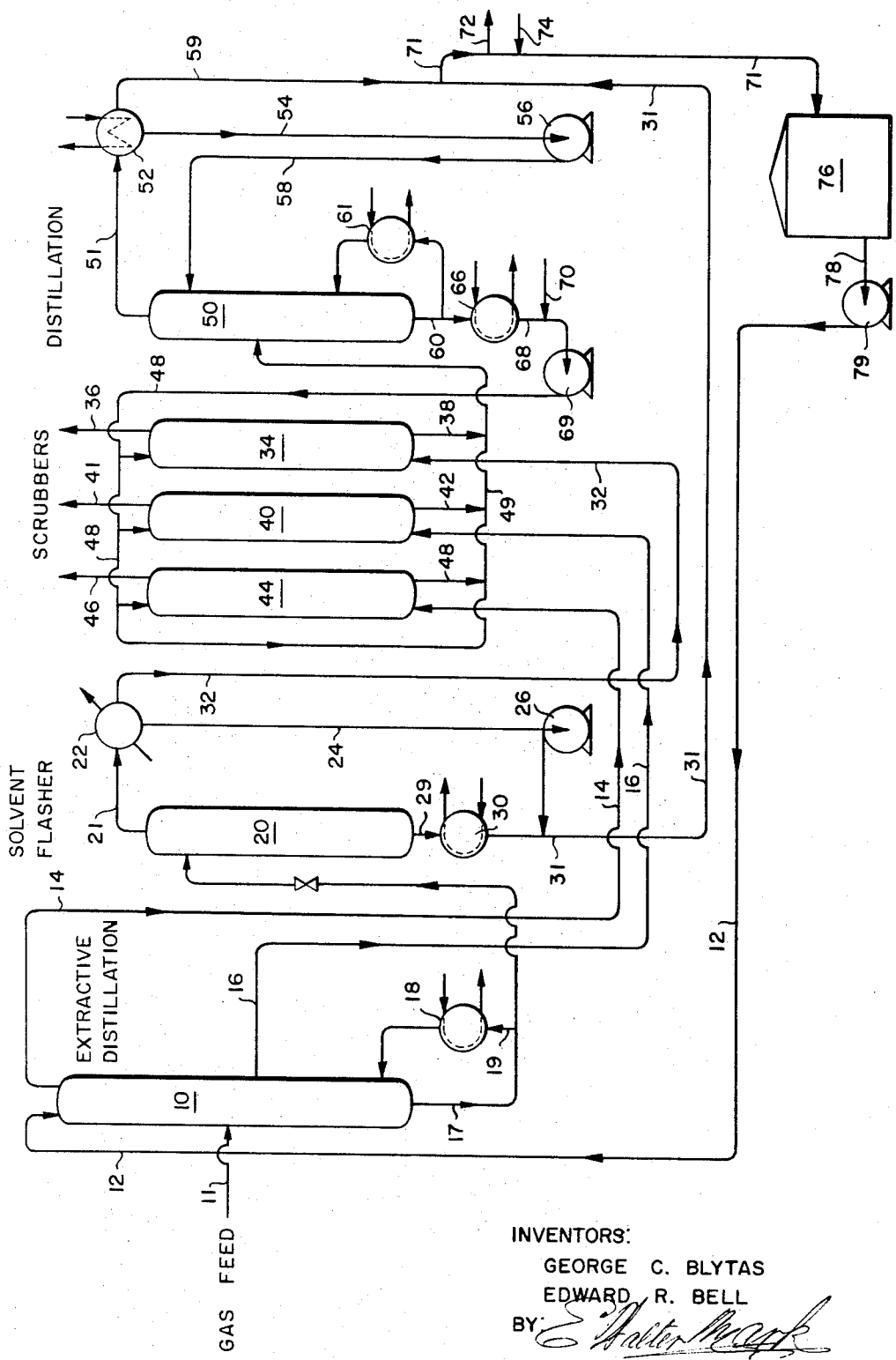

ABSTRACT OF THE DISCLOSURE

Carbon monoxide, useful in various carbonylations, is recovered from admixture with other gases, such as hydrogen and lower aliphatic hydrocarbons, including olefins such as propylene, by selective complexation with a cuprous salt, e.g., cuprous chloride, in propionitrile at 20° C. to 100° C., after which the carbon monoxide is recovered from the complex by heating.

Prior art

The separation of carbon monoxide is important in the purification of ammonia-synthesis gas produced by the partial oxidation of hydrocarbons, the water-gas reaction, or steam-hydrocarbon reforming. The carbon monoxide in even minor amounts, i.e., 2% to 4%, must be removed quite completely in order to prevent poisoning of the ammonia conversion catalyst. A method of removing carbon dioxide that has met with industrial acceptance is an absorption process with an aqueous solution of a copper-ammonium salt of a weak acid, usually a formate, carbonate or acetate, although other salts of weak acids have been proposed. These systems, however, suffer from problems such as sludge formation and high volatility of the solvent, requiring refrigeration for low-temperature operation.

Another method for carbon monoxide absorption is that disclosed by Ray et al. in U.S. Patent 2,519,284, issued Aug. 15, 1950, which makes use of a solution of cuprous chloride in an aromatic amine, viz., ortho-anisidine, to absorb the carbon monoxide. This, along with the methods utilizing copper-ammonium salts of weak acids as complexing or absorbing agents, suffers from the disadvantage of low solubility of the cuprous chloride or other cuprous compounds in the solvent, thus severely limiting the amount of copper that is available for complexation with the carbon monoxide. Further, the practice of adding ammonia as a solvating agent for the copper is not entirely satisfactory, because of the ability of the ammonia itself to complex strongly with cuprous copper, thus limiting again the availability of copper to complex with carbon monoxide.

The drawing

The invention will be better understood, and various aspects, objects and advantages thereof will become apparent from the following description thereof, which will be made in part with reference to the attached drawing. The sole figure of the drawing is a flow diagram illustrating a preferred method according to the invention for recovering carbon monoxide from a mixed feed stream containing, inter alia, carbon monoxide, carbon dioxide, hydrogen, and light saturated and unsaturated hydrocarbons.

The invention

It has now been found that carbon monoxide contained in a gas stream such as water gas, blue gas, producer gas, flue gas, vent gas and the like, can be absorbed preferentially by treating the mixture, in the substantial absence of water and strongly polar solvents, with a solution of a cuprous salt, such as cuprous chloride, in propionitrile, and subsequently releasing the absorbed carbon monoxide from the absorbate. By avoiding the presence of any substantial amount of strongly competitive ligands for cuprous copper, by avoiding the use of a highly polar solvent, and by employing a solvent in which a large amount of salts of cuprous copper will dissolve, an improved process is attained. The cuprous salt/propionitrile system does not require refrigeration and is free of problems related to sludge formation and high volatility of solvent. Complete recovery of the carbon monoxide can be accomplished at temperatures not higher than about 100° C.

In accordance with the present invention, a gas stream containing carbon monoxide together with other gases, such as carbon dioxide, hydrogen, low-molecular-weight aliphatic hydrocarbons, and various inert diluents such as nitrogen and argon, such as are found in flue gases or vent gases which are produced in processes in which hydrocarbons are reacted with carbon monoxide-containing gases, such as, e.g., oxo, hydroformylation and carbonylation reactions, in which carbon monoxide, with or without hydrogen, is reacted with olefins in the presence of dicobalt octacarbonyl, or other carbonylation catalysts, which may be followed by separate hydrogenation of the "oxo" aldehydes formed by carbonylation, is treated with a cuprous salt/solvent mixture in the substantial absence of water to selectively complex the carbon monoxide and the more unsaturated hydrocarbons, such as propylene. The complexed carbon monoxide and unsaturated hydrocarbons are separated, preferably in an extractive distillation with an appropriate solvent, from the uncomplexed gases, and the non-chemically complexed gases (e.g., hydrogen, carbon dioxide, nitrogen and saturated hydrocarbons) are rejected. The complexed unsaturated hydrocarbons are stripped from the rich solvent in a first stripping section of the extractive distillation or in a separate distillation column with additional lean-solvent reflux. The resulting hydrocarbon-free carbon monoxide-rich solvent is flashed to remove high-purity carbon monoxide. The solvent may subsequently be recovered from the carbon monoxide effluent by gas-scrubbing trains and/or condensers.

The copper salt

The cuprous salt employed in the separation is preferably cuprous chloride, although other cuprous salts of strong acids which are at least 5% by weight, preferably 20% by weight, soluble in propionitrile can be used. The salt may be obtained from any suitable source, and various ones are commercially available in varying grades of purity. It is desirable, however, to have a high percentage of cuprous copper in the complexing solution; and, for this reason, it is preferred to use a high-purity salt.

The solvent

In choosing a suitable solvent for use in a process such as an extractive distillation wherein a heating cycle is involved, thermal stability of the system is a major consideration. For example, when separating gas mixtures containing olefins, high temperatures, which would tend to polymerize the olefins contained in such gas streams, are to be avoided. For this reason, in the separation of such gas streams as those described above, it is preferred to use a solvent which does not have an exceedingly high boiling point. Further, the salt should have a high solubility in the chosen solvent. In satisfying these criteria, propionitrile has proven to be exceedingly satisfactory.

The feed

The process of the invention is useful in applications to a variety of feeds. Gaseous mixtures such as found in flue gas or vent gases which are produced, as noted above, in conventional oxo, hydroformylation and carbonylation reactions, and which contain carbon monoxide, can be treated by the process of the invention, and the carbon monoxide recovered therefrom. The feed necessarily contains carbon monoxide, preferably in an amount between about 10 and 30 mole percent. In addition, the feed may contain various unsaturated hydrocarbons, such as propylene, with the remainder being primarily inert material such as hydrogen, carbon dioxide, methane, nitrogen, argon, and various saturated hydrocarbons, e.g., propane.

The salt/solvent system

As noted hereinbefore, it is desirable to have a much cuprous copper in solution as possible; hence, the higher the salt/solvent ratio, the greater will be the complexing capacity of the system, and the greater the amount of carbon monoxide that can be complexed. Salt/solvent mole ratios of from about 1.2 to 0.1, preferably from about 1 to 0.3 cuprous chloride/propionitrile, have given highly satisfactory results. For the cuprous chloride/propionitrile system, the salt/solvent mole ratio of from about 1.2 to 0.1 corresponds to a weight ratio of cuprous chloride to propionitrile of from about 2.16:1 to 0.18:1 and the salt/solvent mole ratio of from about 1 to 0.3 corresponds to a weight ratio of cuprous chloride to propionitrile of from about 1.8:1 to 0.54:1. At a carbon monoxide partial pressure of about 20 p.s.i.a., the CO is soluble in one liter of a 50% CuCl/50% propionitrile solution in an amount of about 0.25 mole at 80° C., and about 1.0 mole at 20° C.; at a CO partial pressure of about 30 p.s.i.a., the solubility is about 0.45 mole at 80° C. up to about 1.45 moles at 20° C.; at a CO partial pressure of about 45 p.s.i.a., at 80° C., about 0.6 mole of CO dissolves, while at 20° C., about 2.3 moles dissolve; at a CO partial pressure of 80 p.s.i.a., the solubility of the CO in the solvent varies between about 1.15 moles at 80° C. to about 2.5 moles at 45° C. The solubility of the carbon monoxide in the 50/50 solution is essentially linear with respect to partial pressure of CO at any given temperature.

The process conditions

The temperature at which the complex is formed is not critical. It is sufficient to note that the higher the temperature, the greater the solubility of the salt in the solvent; however, the higher the temperature, the greater will be the tendency for the unsaturated hydrocarbons present in the feed mixture to polymerize, and for other side reactions to occur. For this reason, it is preferred to perform the complexation step of the invention at a temperature below about 100° C., preferably between about 20° C. and 100° C., still more preferably between about 20° C. and 50° C.

The invention may be executed at subatmospheric, atmospheric or superatmospheric pressures. The use of superatmospheric pressures are, however, generally preferred for operational and capacity reasons. CO partial pressures between about 10 p.s.i.a. and 300 p.s.i.a. and preferably between about 20 p.s.i.a. and 120 p.s.i.a. are suitable. Higher or lower CO partial pressures may, however, be used within the scope of the invention. The particular partial pressure preferably employed will generally be governed to some extent by the pressure at which the gaseous feed is made available.

Once the complexation step has been completed, the CO-CuCl and unsaturate-CuCl complexes in the solvent can be fed into a stripper, wherein the complexed unsaturate is decomposed and the liberated unsaturate stripped from the rich solvent and from the CO-CuCl complex. The stripped unsaturates may be recovered, and subjected to further purification processes. The stripper should be operated at a temperature at which the unsaturate-CuCl complex is unstable but the CO-CuCl complex still stable under their respective partial pressures. Since the unsaturate complex is less stable than the CO complex, this temperature could range from about 50 to about 80° C., depending upon the composition of the vapor phases.

The bottoms from the unsaturates stripper contains the complexed CO, which after separation from the unsaturates, can be decomposed and the CO recovered overhead in a simple flasher. The extent of the recovery of the CO from the complex will depend on the temperature and the CO partial pressure maintained on the system. In general a maximum temperature of about 150° C. is used, but it is preferred to remove the CO at a temperature of about 80° to about 120° C. The residual salt/solvent solution can be recycled to the initial absorption or extractive distillation zone, for contact with fresh feed gases.

Referring now to the drawing, a feed stream containing about 20 mole percent CO and about 3 mole percent propylene, the remainder being inert gases which will not react with the salt, including carbon dioxide, hydrogen, and lower saturated hydrocarbons of from 1 to 3 carbon atoms, is fed via line 11 into the upper portion of an extractive distillation column 10, operated at a pressure of about 220 p.s.i.g., and a bottoms temperature of about 20 to 60° C. The solvent, about 50% by weight cuprous chloride in propionitrile, is introduced through line 12 near the top of the column, and flows down the column (provided with suitable gas-liquid contacting trays) cocurrent with the feed. The carbon dioxide, hydrogen, saturated hydrocarbons and other inerts, which are not complexed by the solvent mixture, are taken off from the top of the column through line 14, and are subsequently passed into and through a gas scrubber 44 to remove any entrained propionitrile from the gaseous effluent, the light gases being removed from the top of the column 44 through line 46, and the solvent being tapped off for recycle through lines 48 and 49.

The complex comprising carbon monoxide in the solvent mixture is taken from the bottom of column 10 via line 17 and passed into a solvent flasher 20. The flasher is operated at a pressure of about 50 p.s.i.a., with cooler 30 being provided to lower the temperature from about 115° C. to about 45–50° C. A reboiler 18 may be provided, fed by take-off line 19 from line 17. In the solvent flasher 20, the CO-rich solvent is flashed to break up the complex, the gaseous CO exiting from the flasher 20 through line 21 and the solvent being taken off through the bottom line 29. The carbon monoxide, together with any entrained solvent, is passed into a condenser 22, and subsequently through line 32 into the bottom of a gas scrubber 34, operated at about 50 p.s.i.a., where it is washed with propionitrile entering through line 48 before leaving the scrubber through line 36. The CO removed through this line is of very high purity, and may be passed to storage units for subsequent use.

Since cuprous chloride also complexes with unsaturated hydrocarbons, but less readily than with carbon monoxide, if desired, an unsaturate-rich gas side stream containing propionitrile may be taken off from the extractive distillation column 10, and the unsaturate recovered from it. Column 10 may be provided with a take-off line 16, through which this unsaturate-propionitrile stream is removed. The unsaturate-propionitrile stream is passed through line 16 into the bottom of a gas scrubber 40, where it is washed with liquid propionitrile, the unsaturate leaving the scrubber through line 41, and the propionitrile wash liquid with condensed propionitrile being returned to line 49 via line 42 from the bottom of the column.

The gas scrubbers 34, 40 and 44 may contain suitable inert packing, and are required to remove any propionitrile, which is relatively volatile, which has been entrained in the effluents from these columns. The fresh propionitrile is cycled to these scrubbers through line 48, and withdrawn from the scrubbers through line 49, through which it is fed into a solvent distillation column 50 for purification. The propionitrile is taken off from the top of column 50 via line 51, and passed through the column condenser 12 into line 59. Pump 56 and lines 54 and 58 return a portion of condensed propionitrile to the top of the column 50. The bottoms from column 50 are taken off through line 60, passed through reboiler 66 and line 68, and are fed via pump 69 back into line 48 for recycle to the gas scrubbing units. A reboiler 61 may be provided if desired. Additional quantities of propionitrile may be added as makeup through line 70.

The solvent mixture from the solvent flasher 20 is taken off through bottoms line 29, cooler 30, and line 31, and is admixed with propionitrile coming in at line 59 and introduced into line 71 discharging into storage means 76. A gas purge 72 may be provided. Additional quantities of CuCl/propionitrile solvent may be added through line 74. Solvent is recycled through surge line 78, pump 79 and line 12.

We claim as our invention:

1. A process for the separation of carbon monoxide from mixtures with at least one of carbon dioxide, hydrogen, and lower aliphatic saturated or unsaturated hydrocarbons, comprising intimately contacting said mixture at a temperature of from about 20° C. to about 100° C. with cuprous chloride provided as a solution in propionitrile, the mole ratio of cuprous chloride to propionitrile being from about 1.2 to 0.1, to selectively complex the carbon monoxide to form a cuprous chloride-carbon monoxide complex, and separating and decomposing the complex to remove the carbon monoxide.

2. A process in accordance with claim 1 wherein the mole ratio of cuprous chloride to propionitrile is from about 1 to 0.3.

3. A process in accordance with claim 2 wherein the complex is thermally decomposed at a temperature from about 80° C. to about 150° C.

4. A cuprous chloride-propionitrile solution wherein the mole ratio of cuprous chloride to propionitrile is from 0.3 to about 1.

References Cited

UNITED STATES PATENTS 2,519,284  8/1950  Ray et al. _____ 23—204

OSCAR R. VERTIZ, *Primary Examiner.*

H. S. MILLER, *Assistant Examiner.*

U.S. Cl. X.R.

23—204, 2, 267; 260—681.5; 252—189